United States Patent
Clos

(10) Patent No.: US 9,556,667 B2
(45) Date of Patent: *Jan. 31, 2017

(54) METHOD AND APPARATUS FOR ESTABLISHING AN ENVIRONMENTALLY ISOLATED VOLUME

(71) Applicant: The Boeing Company, Chicago, IL (US)

(72) Inventor: William Robert Clos, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/773,049

(22) Filed: Feb. 21, 2013

(65) Prior Publication Data

US 2013/0292069 A1 Nov. 7, 2013

Related U.S. Application Data

(60) Provisional application No. 61/641,102, filed on May 1, 2012.

(51) Int. Cl.
| | |
|---|---|
| *E06B 5/12* | (2006.01) |
| *B64C 1/06* | (2006.01) |
| *B64D 11/00* | (2006.01) |
| *B64C 1/00* | (2006.01) |

(52) U.S. Cl.
CPC .......... *E06B 5/12* (2013.01); *B64C 1/066* (2013.01); *B64D 11/0023* (2013.01); *B64C 2001/009* (2013.01)

(58) Field of Classification Search
CPC .............. E06B 5/12; E06B 5/16; B64C 1/066; B64D 11/0023
USPC ...... 160/330, 368.1, 333, 338, 9; 244/118.5, 244/118.1, 129.1; 292/163, 252
See application file for complete search history.

(56) References Cited

U.S. PATENT DOCUMENTS

| | | | |
|---|---|---|---|
| 2,605,064 A | | 7/1952 | Davis |
| 3,294,034 A | * | 12/1966 | Bodenheimer et al. .......... 410/1 |
| 3,872,634 A | | 3/1975 | Seaman |
| 4,046,186 A | * | 9/1977 | Nordstrom ................. 160/368.1 |
| 4,290,243 A | | 9/1981 | Mellin |
| 4,429,730 A | * | 2/1984 | Elston ........................ 160/368.1 |
| 4,538,663 A | * | 9/1985 | Looker ...................... 160/368.1 |
| 4,601,405 A | * | 7/1986 | Riemer ......................... 220/1.5 |

(Continued)

OTHER PUBLICATIONS

Notice of Allowance for U.S. Appl. No. 13/781,004 dated Jun. 13, 2014.

*Primary Examiner* — Katherine Mitchell
*Assistant Examiner* — Scott Denion
(74) *Attorney, Agent, or Firm* — Alston & Bird LLP

(57) ABSTRACT

A method and apparatus are provided for at least partially environmentally isolating a volume, such as by environmentally isolating the cargo compartment from the passenger compartment of an aircraft. In the context of an apparatus, a barrier curtain is provided that partially defines the volume. The apparatus also includes a cable extending along one or more walls that partially define the volume. The barrier curtain is supported by the cable. The apparatus may also include a cable release mechanism. The cable is held in place by the cable release mechanism and the cable release mechanism is configured to detach the cable at a predetermined load, thereby permitting the barrier curtain to drop in response to a decompression event.

12 Claims, 6 Drawing Sheets

(56) References Cited

U.S. PATENT DOCUMENTS

| | | | |
|---|---|---|---|
| 5,217,132 A * | 6/1993 | Looker | 220/1.5 |
| 5,667,002 A * | 9/1997 | Neustadt | 160/368.1 |
| 5,765,883 A * | 6/1998 | Dessenberger et al. | 292/92 |
| 6,863,980 B2 | 3/2005 | Misciagna et al. | |
| 7,264,284 B2 * | 9/2007 | Hsu | 292/252 |
| 7,530,529 B2 * | 5/2009 | Bock | 244/118.5 |
| 8,479,801 B2 * | 7/2013 | Holland et al. | 160/368.1 |
| 2005/0116100 A1 * | 6/2005 | Pratt et al. | 244/118.5 |
| 2013/0292069 A1 * | 11/2013 | Clos | 160/329 |
| 2013/0340954 A1 | 12/2013 | Kauffman | |

* cited by examiner

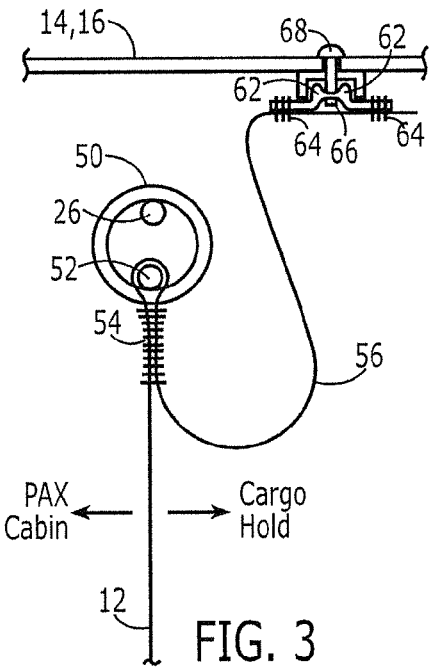
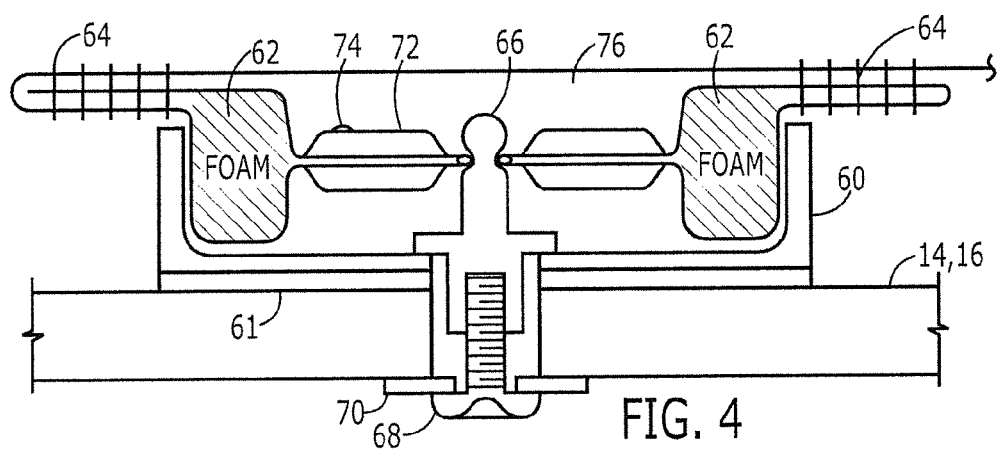
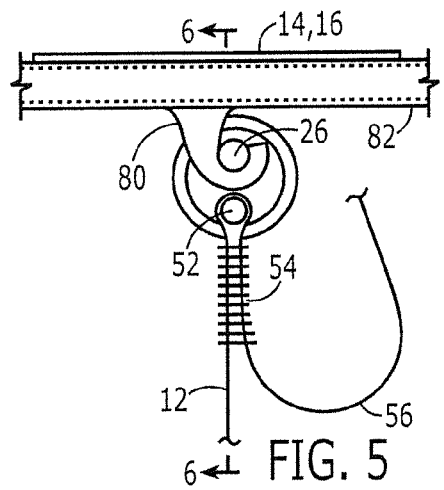
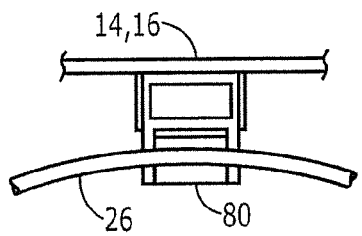

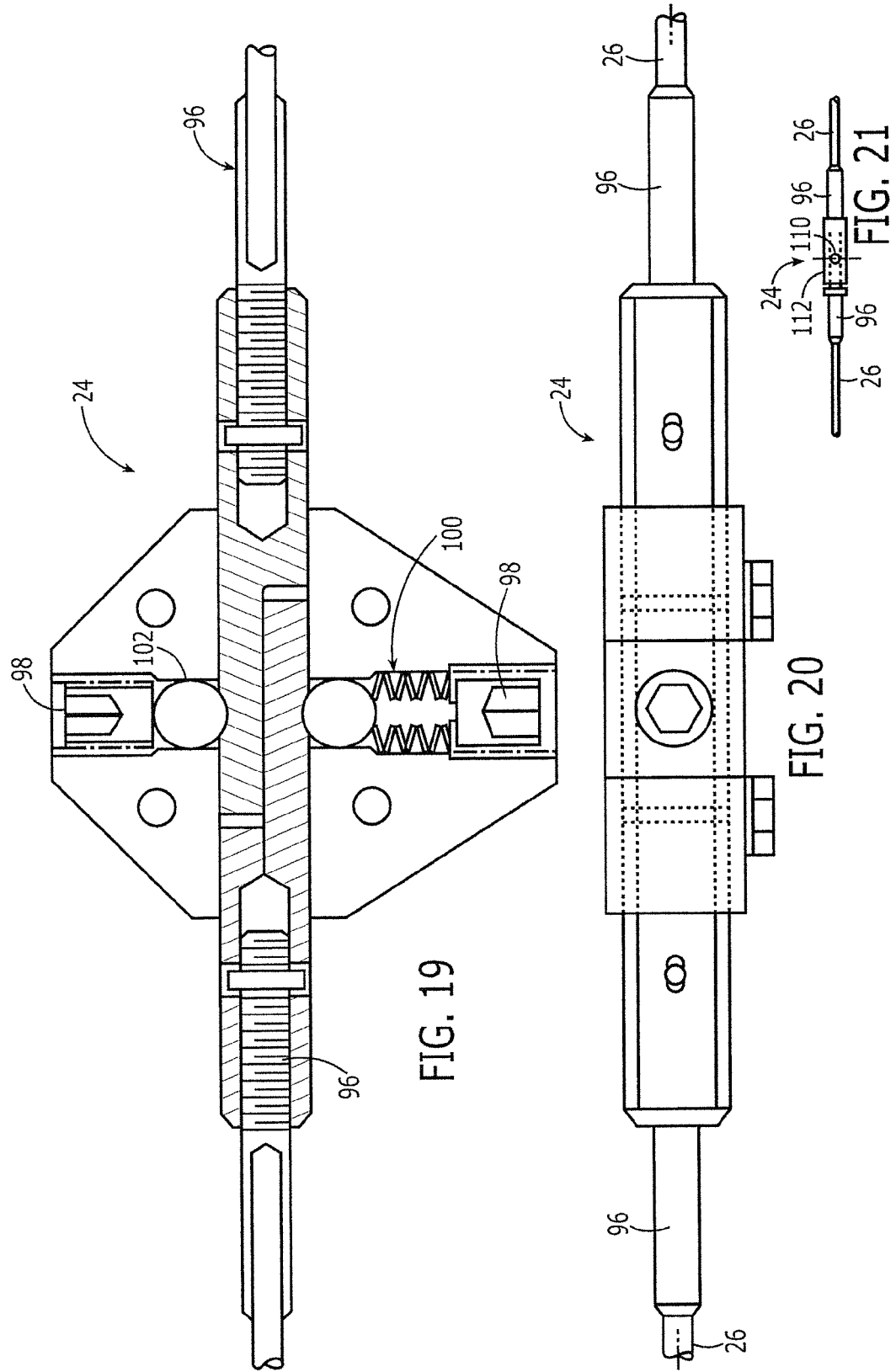

METHOD AND APPARATUS FOR ESTABLISHING AN ENVIRONMENTALLY ISOLATED VOLUME

CROSS-REFERENCE TO RELATED APPLICATIONS

The present application claims priority from U.S. Provisional Patent Application No. 61/641,102 filed May 1, 2012, the contents of which are incorporated herein in their entirety.

TECHNOLOGICAL FIELD

An embodiment of the present disclosure relates generally to a method and an apparatus for establishing an environmentally isolated volume and, more particularly, to a method and apparatus for establishing an environmentally isolated volume so as to provide for flame, smoke or other particulate isolation while also being responsive to pressure variations including an explosive decompression.

BACKGROUND

It may be desirable to environmentally isolate various spaces from one another in order to provide for flame, smoke or other particulate isolation. For example, within an aircraft fuselage, the passenger compartment may be environmentally isolated from the cargo compartment so as to provide smoke or flame isolation, thereby reducing smoke or flame dispersion within the fuselage of the aircraft. Within an aircraft, the environmental isolation of the passenger compartment from the cargo compartment may be complicated by the cabin pressure differences between the passenger compartment and the cargo compartment. In this regard, some aircraft include a frame or other structural member positioned between the cargo compartment and the passenger compartment for supporting a barrier that extends between the compartments. As the frame or other structural members must be capable of carrying the loads created by the differential pressure between the passenger compartment and the cargo compartment under normal operating conditions, the frame or other structural members may be structurally substantial, thereby adding to the cost and weight of the aircraft.

In addition to compensating for pressure variations between the passenger compartment and the cargo compartment, environmental isolation techniques must also account for rapid decompression events and, as such, aircraft may include integral decompression panels. The pressure differential at which the integral decompression panels are caused to open may be dependent on friction which may, in turn, vary over time and from installation to installation, such as in response to material properties, material incompatibilities, dirt, debris or the like.

BRIEF SUMMARY

A method and apparatus are provided for at least partially environmentally isolating a volume, such as by environmentally isolating the cargo compartment from the passenger compartment of an aircraft. By environmentally isolating the volume, the method and apparatus of an example embodiment of the present disclosure provide for smoke or flame isolation, thereby limiting or preventing smoke or flame dispersion. The method and apparatus are also configured to environmentally isolate the volume in a manner that compensates for pressure variations, such as pressure variations between the cargo compartment and the passenger compartment of an aircraft in a manner that does not require a substantial perimeter frame or other structural members to support and transfer the differential pressure loads that may exist under normal operating conditions. Additionally, the method and apparatus of an embodiment of the present disclosure accommodate decompression events and, in one embodiment, accommodate explosive decompression events without requiring decompression panels.

In one embodiment, an apparatus for at least partially environmentally isolating the volume is provided. The apparatus includes a barrier curtain that partially defines the volume. The apparatus also includes a cable extending along one or more walls or the ceiling that partially define the volume. The barrier curtain is supported by the cable. The apparatus of this embodiment also includes a cable release mechanism attached to a respective wall or ceiling. The cable is held in place by the cable release mechanism and the cable release mechanism is configured to detach the cable at a predetermined load, thereby permitting the barrier curtain to drop in response to a decompression event. As such, the cable release mechanism may be configured to release the first cable (or cables) in response to a load that equals or exceeds a predetermined threshold.

In an embodiment in which the first cable includes first and second portions, the cable release mechanism may be configured to engage the first and second portions of the first cable. The apparatus of one embodiment may also include a plurality of attachment mechanisms spaced apart along the one or more walls. Each attachment mechanism of this embodiment may be configured to releasably attach the first cable to a respective wall. The apparatus may also include a second cable attached to the barrier curtain and, in one embodiment, may further include a plurality of rings through which the first and second cables extend. The apparatus of one embodiment may also include a plurality of seals attached to the one or more walls and configured to secure an edge of the barrier curtain to the respective wall. Further, the apparatus may include an attachment mechanism configured to attach the first cable to a floor. In this embodiment, the attachment mechanism may include a spring to permit lengthening of the first cable.

In another embodiment, an apparatus is provided for at least partially environmentally isolating a passenger compartment from a cargo compartment. The apparatus includes a barrier curtain that separates the passenger compartment from the cargo compartment. The apparatus also includes a first cable attached to a floor and extending along one or more side walls and one or more ceiling panels with the barrier curtain being supported by the first cable. The apparatus further includes a cable release mechanism attached to a respective ceiling panel. The first cable is held in place by the cable release mechanism. Further, the cable release mechanism is configured to detach or release the first cable in response to a load that equals or exceeds a predetermined threshold. As such, the cable release mechanism may be configured to release the first cable in response to a load that equals or exceeds a predetermined threshold.

In an embodiment in which the first cable includes first and second portions, the cable release mechanism may be configured to engage the first and second portions of the first cable. The apparatus of one embodiment may also include a plurality of attachment mechanisms spaced apart along the one or more side walls. Each attachment mechanism of this embodiment may be configured to releasably attach the first cable to a respective wall. The apparatus may also include a second cable attached to the barrier curtain and, in one embodiment, may further include a plurality of rings through which the first and second cables extend. The apparatus of one embodiment may also include a plurality of seals attached to the one or more walls and configured to secure an edge of the barrier curtain to the respective wall. Further, the apparatus may include an attachment mechanism configured to attach the first cable to the floor. In this embodiment, the attachment mechanism may include a spring to permit lengthening of the first cable.

In a further embodiment, a method is provided for at least partially environmentally isolating a volume. The method includes releasably attaching a first cable to one or more walls that partially define the volume. The method also supports a barrier curtain that partially defines the volume with the first cable. The method further includes engaging the first cable with a cable release mechanism and permitting the cable release mechanism to detach the cable in response to a load that equals or exceeds a predetermined threshold.

The method of one embodiment also includes releasing the first cable from the cable release mechanism upon activating the cable release mechanism in response to a load that equals or exceeds a predetermined threshold. In an embodiment in which the first cable includes first and second portions, and the method may engage the first cable with the cable release mechanism by engaging the first and second portions of the first cable with the cable release mechanism being configured to detach the first cable in response to a load that equals or exceeds a predetermined threshold. The method of one embodiment may also attach the first cable to a floor so as to permit lengthening of the first cable.

BRIEF DESCRIPTION OF THE SEVERAL VIEWS OF THE DRAWINGS

Figure 1:
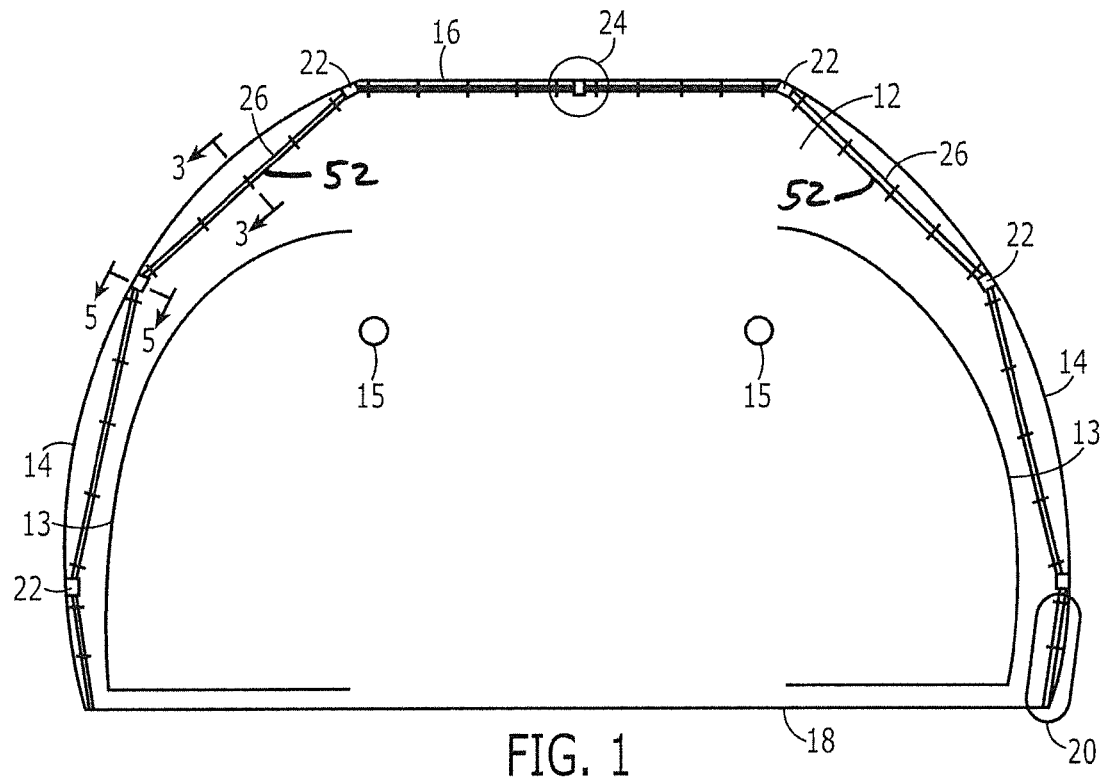
Figure 2:
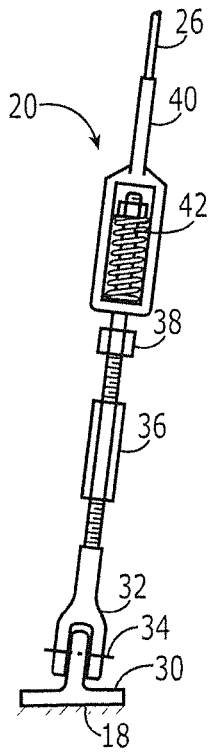
Figure 7:
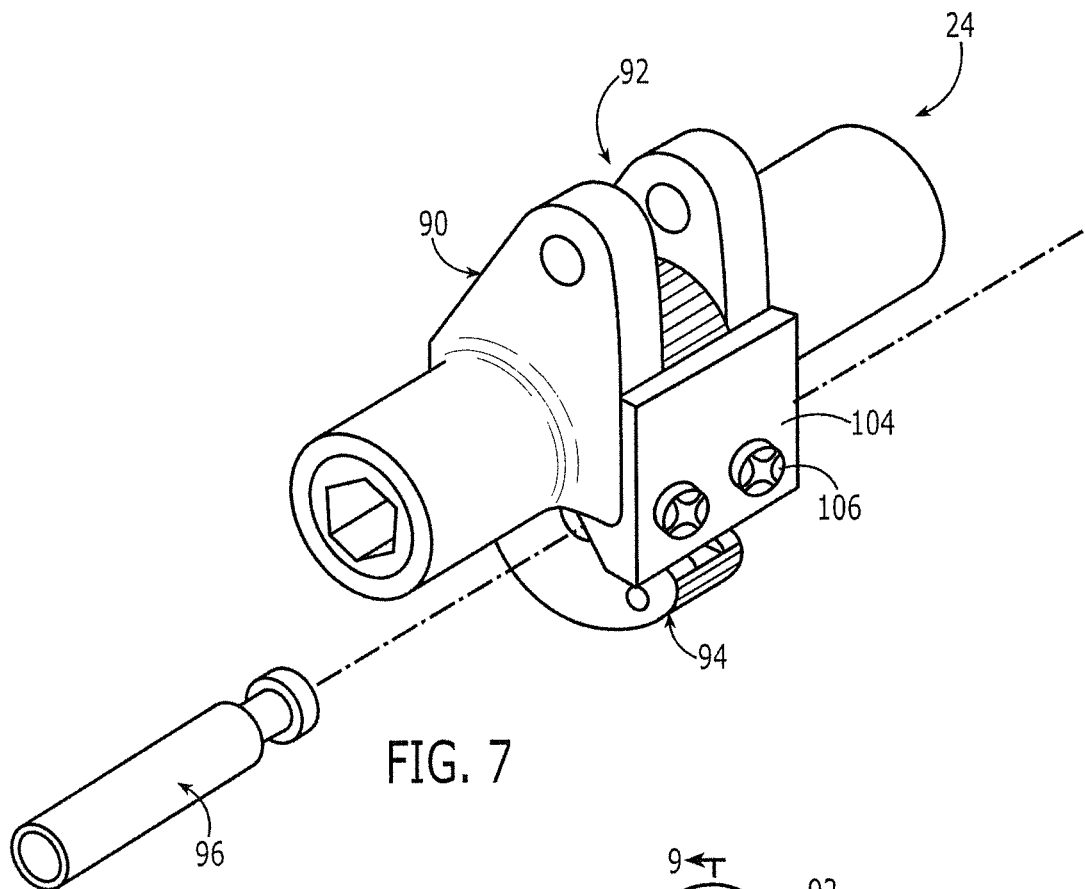
Figure 8:
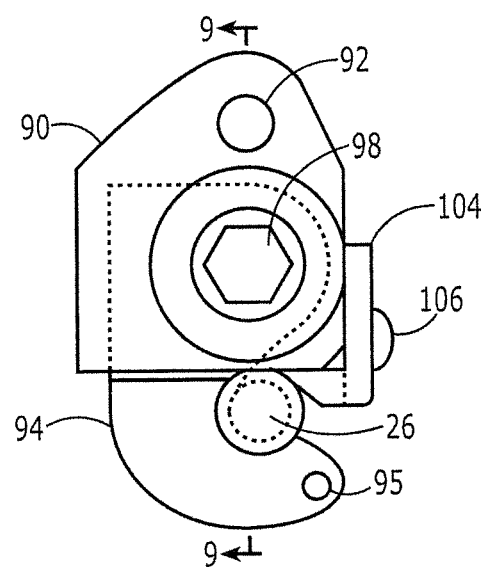
Figure 9:
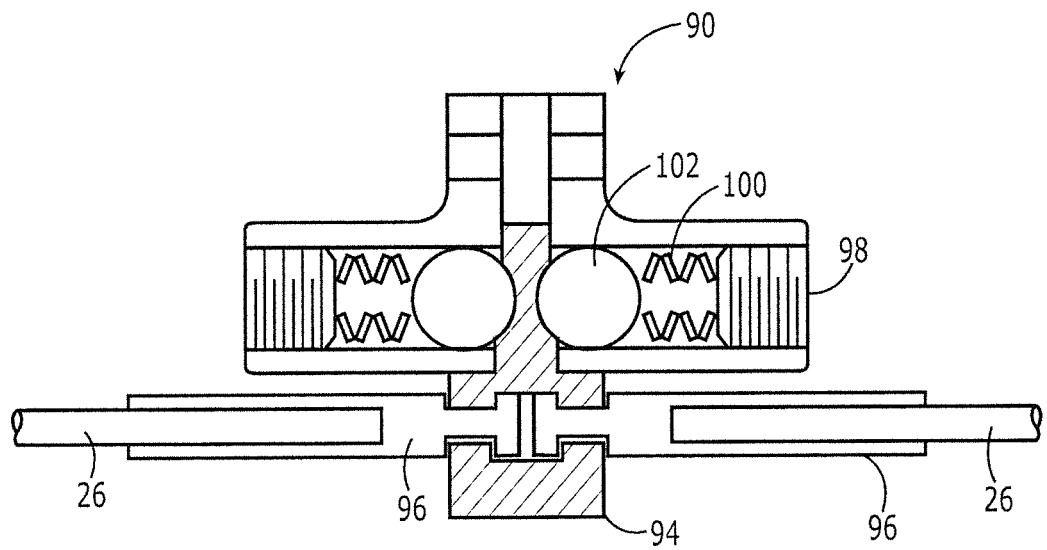
Figure 10:
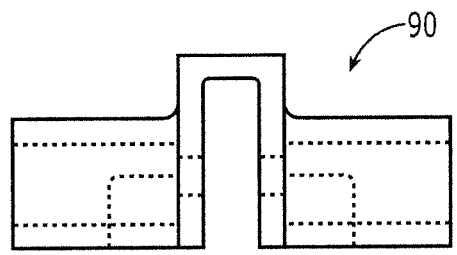
Figure 11:
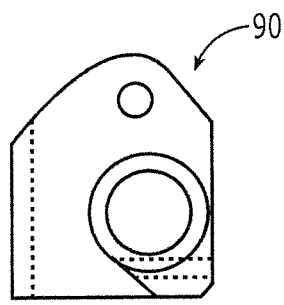
Figure 12:
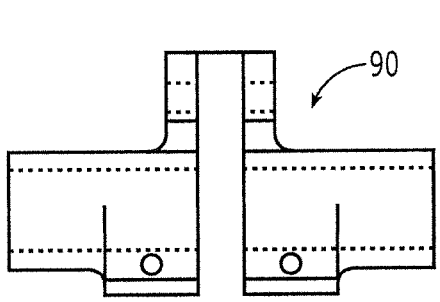
Figure 13:
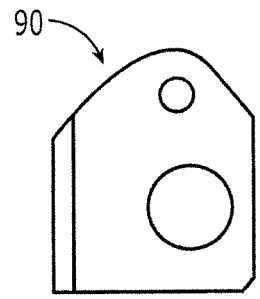
Figure 14:
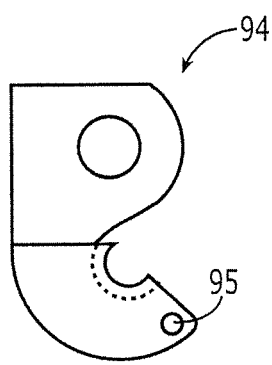
Figure 15:
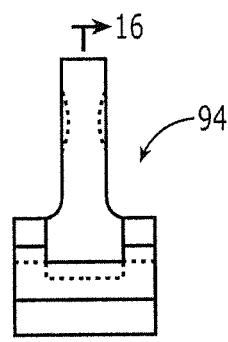
Figure 16:
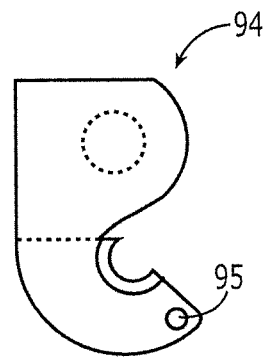
Figure 17:
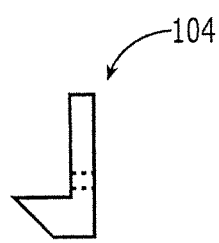
Figure 18:
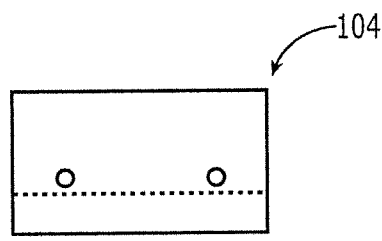

Having thus described an embodiment of the present disclosure in general terms, reference will now be made to the accompanying drawings, which are not necessarily drawn to scale, and wherein:

FIG. 1 is a view from the passenger compartment toward the cargo compartment that illustrates the barrier positioned therebetween in accordance with one embodiment of the present disclosure;

FIG. 2 illustrates a mechanism for attaching a cable to the airframe in accordance with one embodiment of the present disclosure;

FIG. 3 is a cross-sectional view taken along line 3-3 of FIG. 1 illustrating the attachment of the barrier curtain to a sidewall;

FIG. 4 is a more detailed representation of a seal for attaching the barrier curtain to a sidewall in accordance with one embodiment of the present disclosure;

FIG. 5 is a cross-sectional view taken along line 5-5 of FIG. 1 illustrating the attachment of the cable to the sidewall;

FIG. 6 is a cross-sectional view taken along line 6-6 of FIG. 5 which illustrates a hook attached to the sidewall and configured to carry the cable;

FIG. 7 is a perspective view of the cable release mechanism in accordance with one embodiment of the present disclosure;

FIG. 8 is a side view of the cable release mechanism of FIG. 7;

FIG. 9 is a cross-sectional view of the cable release mechanism taken along line 9-9 of FIG. 8;

FIG. 10 is a top view of the clevis fitting of the cable release mechanism body of FIGS. 7 and 8;

FIG. 11 is a side view of the cable release mechanism body of FIG. 10;

FIG. 12 is a front view of the cable release mechanism body of FIG. 10;

FIG. 13 is a side view of the cable release mechanism body of FIG. 10;

FIG. 14 is a side view of the hook of the cable release mechanism of FIGS. 7 and 8;

FIG. 15 is a front view of the hook of FIG. 14;

FIG. 16 is a cross-sectional view of the hook taken along line 16-16 of FIG. 15;

FIG. 17 is a side view of the clip of the cable release mechanism of FIGS. 7 and 8;

FIG. 18 is a front view of the clip of FIG. 17;

FIG. 19 is a top view of a cable release mechanism in accordance with another embodiment of the present disclosure;

FIG. 20 is side view of the cable release mechanism of FIG. 19; and

FIG. 21 is a top view of a cable release mechanism in accordance with yet another embodiment of the present disclosure.

DETAILED DESCRIPTION

The present disclosure now will be described more fully with reference to the accompanying drawings, in which some, but not all embodiments of the invention are shown. This disclosure may be embodied in many different forms and should not be construed as limited to the embodiments set forth; rather, these embodiments are provided so that this disclosure will be thorough and complete, and will fully convey the scope of the invention to those skilled in the art. Like numbers refer to like elements throughout.

In a number of situations, it may be desirable to environmentally isolate one volume from an adjacent volume, such as for smoke or flame isolation, thereby limiting or preventing smoke or flame dispersion between the volumes. For example, an aircraft may include various compartments that may be environmentally isolated from one another, such as the environmental isolation between the passenger compartment and the cargo compartment on board an aircraft, thereby limiting or preventing smoke and/or flame dispersion throughout the aircraft. A method and apparatus of one embodiment of the present disclosure will be hereinafter described in conjunction with the environmental separation between the passenger compartment and the cargo compartment on board an aircraft. However, the method and apparatus of other embodiments of the present disclosure may be deployed in other situations, either on board an aircraft or elsewhere, in order to environmentally isolate other volumes.

Referring now to FIG. 1, an apparatus for at least partially environmentally isolating a volume, such as for environmentally isolating the passenger compartment from the cargo compartment of an aircraft, is illustrated. As shown, the apparatus may include a barrier curtain 12, which in combination with the walls of the aircraft including the sidewalls 14, the ceiling panels 16 and the floor 18, define the volume, such as the cargo compartment, that is to be environmentally isolated. The barrier curtain 12 may be formed of various materials including fire and smoke resistant materials, such as neoprene impregnated fiberglass material. The barrier curtain 12 extends between the side walls 14 and from the ceiling panels 16 to the floor 18 so as to separate the cargo compartment from the passenger compartment.

In accordance with an embodiment of the present disclosure, the apparatus also includes a first cable 26 that extends along one or more walls, such as one or more of the side walls 14 and the ceiling 16, and the barrier curtain 12 is, in turn, supported by the first cable. In some embodiments, the volume that is to be environmentally isolated, such as the cargo compartment, is open at two opposed ends in the absence of the barrier curtain 12. For example, a cargo compartment may be positioned in the midsection of an aircraft and, as such, it may be desirable to environmentally isolate the cargo compartment from passenger compartments both forward and rearward of the cargo compartment. As such, a barrier curtain 12 may be installed at each of the two opposed ends of the volume. Thus, while FIG. 1 illustrates the barrier curtain 12 positioned at one end of the volume, a comparable barrier curtain may be positioned at the other end of the volume.

As shown in FIG. 1, the barrier curtain 12 may include one or more zippers 13. Once the zippers 13 are unzipped, a person may pass through the barrier curtain 12, thereby permitting movement between the passenger compartment and the cargo compartment. In order to provide for the environmental isolation, however, the zippers 13 are generally zipped closed. In one embodiment, the barrier curtain 12 also includes a viewport 15, such as a glass viewport that is sealed about its periphery, thereby allowing a person in one compartment to look into the adjacent compartment without compromising the environmental isolation.

As noted above, the barrier curtain 12 is supported by a first cable 26. The first cable 26 extends along and is attached to one or more of the walls that define the volume. In the illustrated embodiment, the opposite ends of the first cable 26 are attached to the floor 18. While the first cable 26 may be attached to the floor 18 in various manners, FIG. 2 illustrates one attachment mechanism 20 for attaching a respective end of the first cable 26 to the floor 18. In this regard, a lug fitting 30 may be mounted to the floor and the attachment mechanism 20 may include a clevis fitting 32 that is rotatably attached to the lug fitting, such as with a pin 34. The attachment of the end of the first cable 26 to the floor 18 may also include a turnbuckle 36 and a hexagonal fitting 38 for providing adjustability in tensioning of the first cable. The attachment mechanism 20 may also include a swage link 40 that is mechanically connected to the first cable 26. As shown in FIG. 2, the attachment mechanism 20 may also include a tensioner compression spring 42 disposed within a cavity defined by the swage link 40. The tensioner compression spring 42 is configured to allow a limited degree of lengthening of the first cable 26, such as 0.3 inches in one embodiment, so as to accommodate thermal expansion and pressurization variations. In one embodiment, a similar attachment mechanism 20 may also affix the other end of the first cable 26 to the floor 18, such as on the opposite side of the aircraft, in order to provide additional lengthening of the first cable, such as 0.6 inches in one embodiment.

As a result of the arcuate or other complex shape of the side walls 14, the first cable 26 may be attached to the side walls at a plurality of discrete locations designated as 22 as will be described below. Between the discrete locations at which the first cable 26 is attached to the side walls 14, the first cable may be spaced apart from the side wall by a distance. In order to provide for the environmental isolation between the volumes, the barrier curtain 12 may be attached to the side walls 14 in those regions in which the first cable 26 is spaced from the side wall. Although the barrier curtain 12 may be attached to the side walls 14 in various manners, FIG. 3 illustrates a cross-sectional view taken along line 3-3 of FIG. 1 of one technique for attaching the barrier curtain to a side wall.

As shown in FIG. 3, the first cable 26 may extend through a ring 50. As also shown in FIG. 3, the barrier curtain 12 is attached to a second cable 52 that also extends through the same ring 50. In this regard, FIG. 1 illustrates the first and second cables 26, 52 as well as the rings 50 through which the cables extend with the rings depicted as hash marks extending across each of the first and second cables. The barrier curtain 12 may be attached to the second cable 52 in various manners, but, in one embodiment, the barrier curtain includes a plurality of reinforced eyelets through which the rings 50 extend with the barrier curtain then being wrapped about the second cable with the overlapping portions of the barrier curtain being stitched together as shown at 54 of FIG. 3. The first and second cables 26, 52 may, in one embodiment, be the same type of cable, such as a nylon coated, stainless steel cable.

In order to provide for environmental isolation between the adjacent volumes, the barrier curtain 12, such as an edge of the barrier curtain, may extend beyond the second cable 52 and may be attached to a side wall 14 or ceiling panel 16. The edge of the barrier curtain 12 may be attached to a side wall 14 or ceiling panel 16 in various manners including, in one embodiment as shown in FIG. 3 and, in more detail, in FIG. 4, with a seal. In this regard, the seal may include a channel 60, such as a fiberglass channel, that is attached to the side wall 14 or ceiling panel 16 with, for example, double-back foam tape 61. The seal may also include foam portions 62 to which the edge of the barrier curtain 12 is stitched as shown at 64. The foam portions 62 may, in turn, be secured within the channel 60 by a fastener, such as a lift-the-dot fastener. As shown in FIG. 4, for example, the lift-the-dot fastener may include a lift-the-dot stud 66 that is attached to the side wall 14 or ceiling panel 16 with a screw 68 and washer 70 and that engages a lift-the-dot grommet 72 having a dot 74 disposed within the channel 60 and secured to the foam portions 62. As such, the edge of the barrier curtain 12 may be attached to the foam portions 62, such as by stitching 64, with the foam portions, in turn, secured to the lift-the-dot grommet 72 with the resulting assembly then being snapped into engagement with the lift-the-dot stud 66 so as to secure the edge of the barrier curtain to a side wall or a ceiling panel in order to provide for the environmental isolation. In one embodiment, a reinforcement material 76, such as Kevlar material, may be attached to the barrier curtain 12 so as to avoid abrasion or puncturing of the barrier curtain by the lift-to-dot fastener.

As shown in FIG. 3, the portion of the barrier curtain 12 between the second cable 52 and the seal may include a slack region 56 to accommodate some flexure of the barrier curtain and the first and second cables without disturbing the seal between the edge of the barrier curtain and the side wall 14 or ceiling panel 16. Although one seal is illustrated and described above, the apparatus of one embodiment may include a plurality of seals positioned along the side walls 14 and/or ceiling panels 16 in those regions in which the first cable 26 is spaced from the side wall or ceiling panel.

As also illustrated in FIG. 1, the first cable 26 is attached to the side wall 14 and/or ceiling panels 16 at a number of different positions. Although the first cable 26 may be attached to the side walls 14 and/or ceiling panels 16 in various manners, one mechanism for attaching the first cable to a side wall or ceiling panel is shown, for example, in FIGS. 5 and 6. In this regard, a hook 80 may be attached to the side wall 14 or ceiling panel 16 and the first cable 26 may be engaged by the hook so as to be held proximate the side wall or ceiling panel. In this regard, the hook 80 may include or otherwise be carried by a support bracket 82 that extends lengthwise so as to attached to the frame. As shown in FIG. 5 and as described above, the first and second cables 26, 52 may both extend through a plurality of rings 50 and the edge of barrier curtain 12 may be attached to the side wall 14 and/or ceiling panels 16 in the manner described above in conjunction with FIGS. 3 and 4 so as to provide for the environmental isolation. Although one mechanism for attaching the first cable 26 to a side wall 14 or ceiling panel 16 is shown in FIGS. 5 and 6 and described above, other mechanisms may be employed including mechanisms that employ claims or other fasteners instead of hooks 80.

As described above, the barrier curtain 12 provides for environmental isolation between the adjacent volumes, such as between a passenger compartment and a cargo compartment, thereby reducing or preventing smoke and flame dispersion between the adjacent compartments. As a result of the construction of the barrier curtain 12 and the first and second cables 26, 52, as well as the attachment of the opposed ends of the first cable via a tensionor compression spring 42, the barrier curtain 12 is able to accommodate the pressure differential that is anticipated to exist from time to time between the passenger compartment and the cargo compartment during normal operating conditions. However, in some situations, there may be a rapid and substantial differential in pressure between the adjacent volumes, such as between the passenger compartment and the cargo compartment, such as in conjunction with a rapid decompression event, e.g., an explosive decompression. In this situation, the apparatus is configured to release the barrier curtain 12 such that the barrier curtain no longer separates the adjacent volume and, in one embodiment, may drop to the floor so as to permit the volumes to be equally pressurized.

In one embodiment shown, for example, in FIGS. 7 and 8, the first cable 26 may be attached to a side wall 14 or a ceiling panel 16 by a cable release mechanism 24 that secures the first cable to the side wall or the ceiling panel, but that provides for separation of the first cable from the side wall or ceiling panel in an instance in which the load applied to the release mechanism, such as due to differential pressure on the barrier curtain, exceeds a predetermined amount. While the cable release mechanism 24 may be positioned in various locations along the side walls 14 and the ceiling panels 16, the cable release mechanism of one embodiment is positioned proximate a medial portion of the first cable 26, such as about halfway between the opposed ends of the first cable. As such, the cable release mechanism 24 of the illustrated embodiment is attached to a ceiling panel 16.

The cable release mechanism 24 may be constructed in various manners so as to secure the first cable 26 to a side wall 14 or ceiling panel 16 during normal operating conditions, but to release the first cable in an instance in which the release mechanism is subjected to a load that exceeds the predetermined amount. By way of example, but not of limitation, one example of a cable release mechanism is shown in FIG. 7 and includes a clevis fitting 90 that may be attached via attachment flanges 92 to a lug which, in turn, is attached to the ceiling panel 16. Further details regarding the clevis fitting 90 are shown in FIGS. 10-13. The clevis fitting 90 of this embodiment is also attached to the first cable 26. In one embodiment, the cable release mechanism 24 also includes a hook 94 attached to the clevis fitting 90 for engaging the first cable 26. Further details regarding the hook 94 are shown in FIGS. 14-16. In order to permit the release of the barrier curtain 12 upon the release of the first cable 26 by the cable release mechanism 24, the first cable may be separated and, as such, may include first and second portions that are each engaged by the hook 94 of the cable release mechanism. In this regard, a first portion of the first cable 26 may extend from the floor 18 on one side of the aircraft to the cable release mechanism 24, while the second portion of the first cable may extend from the floor on the other side of the aircraft to the cable release mechanism. The ends of the cable portions that are engaged by the hook 94 of the cable release mechanism 24 may each include a cable end fitting 96 that may define a profile that is securely engaged by the hook of the cable release mechanism as shown in FIG. 9.

The hook 94 may be attached to the clevis fitting 90 in various manners, but, in one embodiment, is attached to the clevis fitting by a ball detent mechanism comprising a pair of set screws 98, Bellville washers 100 and ball bearings 102 as also shown in FIG. 9. The ball detent mechanism is configured to secure the hook 94 to the clevis fitting 90 until a separation force that equals or exceeds a predetermined threshold is applied to the hook.

As shown in FIGS. 7 and 8, the first cable 26 may be secured within the hook 94 by a clip 104 that is attached to the clevis fitting, 90 such as with one or more screws 106. In this regard, a clip 104 may include a portion having a profile, such as a tapered profile, configured to engage the first cable 26, such as the cable end fittings 96 of the first and second portions of the first cable and to secure the first cable within the hook 94. See, for example, FIGS. 17 and 18 which show additional details of the clip 104.

In response to a load being exerted on the barrier curtain 12 and, in turn, upon the first cable 26, such as due to a differential pressure across the barrier curtain, that exceeds a predetermined amount, the ball detent mechanism may release the hook 94 from the clevis fitting 90 such that the first and second portions of the first cable are, in turn, released, detached or the like. Without the support by the first cable 26, the attachment of the edge of the barrier curtain 12 to the sidewalls 14 and the ceiling panels 16 by the plurality of seals is overcome such that the barrier curtain pulls away from the sidewalls and the ceiling panels. The first and second portions of the first cable 26 may then pull through the plurality of rings 50 so as to release the barrier curtain 12 which then drops to the floor 18 so as to permit the equalization of pressure between the adjacent volumes, such as between the passenger compartment and the cargo compartment.

In this regard, the cable release mechanism 24 may be configured to release the first cable 26 in response to a load that exceeds a predetermined amount. Thus, the cable release mechanism 24 secures the first cable while the barrier curtain is subjected to loads that do not exceed the predetermined amount. However, once the barrier curtain 12 is subjected to a load that exceeds the predetermined amount, such as in response to an explosive decompression, the first cable 26 is released and the barrier curtain drops to the floor 18.

As noted above, the cable release mechanism 24 may be constructed in other fashions. For example, FIGS. 19 and 20 illustrate a cable release mechanism 24 that is configured to engage the cable end fittings 96 mounted upon the ends of first and second portions of the first cable 26. Each of the cable end fittings 96 of this embodiment include a dimple or other recessed portion that is engaged by the ball bearing 102 of a ball detent mechanism. As described above, in an instance in which the first cable 26 is subjected to a load exceeding a predetermined amount, the ball detent mechanism and, in turn, the cable release mechanism 24 releases the cable end fittings 96 to permit the barrier curtain 12 to be released.

By way of another example depicted in FIG. 21, the cable release mechanism 24 may include a shear pin 110 carried by the cable end fitting 96 of one portion of the first cable 26 and a slip fitting 112 carried by the cable end fitting of the other portion of the first cable. The shear pin 110 is disposed within a slot defined by the slip fitting 112 in instances in which the load carried by the first cable 26 is no more than a predetermined amount. However, in instances in which the load carried by the first cable 26 exceeds the predetermined amount, the shear pin 110 may be sheared off, thereby allowing the portions of the first cable to separate and, in turn, permitting the barrier curtain 12 to be released.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. An apparatus for at least partially environmentally isolating a volume, the apparatus comprising:
   a barrier curtain that includes an an edge that extends alongside a plurality of walls that cooperate with the barrier curtain to partially define the volume;
   a first cable extending along the plurality of walls that partially define the volume, wherein the first cable includes first and second portions, wherein the first and second portions of the first cable extend adjacent to and operatively engage the edge of the barrier curtain that extends alongside the plurality of walls and that at least partially defines the volume such that the barrier curtain is supported by the first cable; and
   a cable release mechanism disposed along a perimeter of the barrier curtain, wherein the first and second portions of the first cable are engaged by and held in place by the cable release mechanism, and wherein the cable release mechanism is configured to detach the first cable by releasing the first and second portions of the first cable in response to a load that equals or exceeds a predetermined threshold.

2. The apparatus according to claim 1 further comprising a plurality of attachment mechanisms spaced apart along the walls, wherein each attachment mechanism is configured to releasably attach the first cable to a respective wall.

3. The apparatus according to claim 1 further comprising a second cable attached to the barrier curtain.

4. The apparatus according to claim 1 further comprising a plurality of rings positioned at spaced locations along the edge of the barrier curtain that extends alongside the walls, wherein the first cable extends through the plurality of rings.

5. The apparatus according to claim 1 further comprising a plurality of seals attached to the walls and configured to secure the edge of the barrier curtain to the respective wall.

6. The apparatus according to claim 1 further comprising an attachment mechanism configured to attach the first cable to a floor, wherein the attachment mechanism comprises a spring.

7. An apparatus for at least partially environmentally isolating a passenger compartment from a cargo compartment, the apparatus comprising:
   a barrier curtain that separates the passenger compartment from the cargo compartment, wherein the barrier curtain includes an edge that extends alongside a plurality of walls that cooperate with the barrier curtain to partially define the volume;
   a first cable attached to a floor and extending along the plurality of side walls and one or more ceiling panels, wherein the first cable includes first and second portions, wherein the first and second portions of the first cable extend adjacent to and operatively engage the edge of the barrier curtain that extends alongside the plurality of walls and that at least partially defines the volume such that the barrier curtain is supported by the first cable; and
   a cable release mechanism attached to a respective ceiling panel, wherein the first and second portions of the first cable is engaged by and held in place by the cable release mechanism, and wherein the cable release mechanism is configured to detach the first cable by releasing the first and second portions of the first cable in response to a load that equals or exceeds a predetermined threshold.

8. The apparatus according to claim 7 further comprising a plurality of attachment mechanisms spaced apart along the side walls, wherein each attachment mechanism is configured to releasably attach the first cable to a respective wall.

9. The apparatus according to claim 7 further comprising a second cable attached to the barrier curtain.

10. The apparatus according to claim 9 further comprising a plurality of rings positioned at spaced locations along the edge of the barrier curtain that extends alongside the walls, wherein the first cable extends through the plurality of rings.

11. The apparatus according to claim 7 further comprising a plurality of seals attached to the walls and configured to secure the edge of the barrier curtain to the respective wall.

12. The apparatus according to claim 7 further comprising an attachment mechanism configured to attach the first cable to the floor, wherein the attachment mechanism comprises a spring.

* * * * *